2,876,262

BASICALLY SUBSTITUTED BUTYRIC ACID AMIDES AND A PROCESS OF PREPARING THEM

Gustav Ehrhart, Bad Soden (Taunus), Ingeborg Hennig, Kelkheim (Taunus), Ernst Lindner, Frankfurt am Main, and Heinrich Ott, Eppstein (Taunus), Germany, assignors to Farbwerke Hoechst Aktiengesellschaft vormals Meister Lucius & Bruning, Frankfurt am Main, Germany, a corporation of Germany No Drawing. Application September 4, 1956
Serial No. 607,563

Claims priority, application Germany December 23, 1955

3 Claims. (Cl. 260—562)

The present invention provides basically substituted butyric acid amides of the general formula

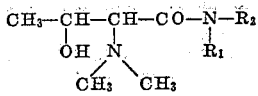

in which $R_1$ represents hydrogen or an alkyl radical containing at most 4 carbon atoms and $R_2$ stands for a phenyl radical that may be substituted, or $R_1$ and $R_2$ together with the adjacent nitrogen atom may form members of a heterocyclic ring system, and a process for the manufacture of these compounds. More particularly, the invention provides compounds of the above formula, in which $R_2$ represents a phenyl radical substituted in para-position, preferably by a low molecular alkoxy radical.

The said basically substituted butyric acid amides are distinguished by good analgesic and sedative properties and a surprisingly low toxicity.

In the process of the invention, the amino group in alpha-amino-beta-hydroxy-butyric acid anilides of the general formula

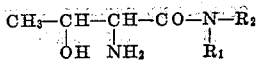

in which $R_1$ and $R_2$ have the meanings given above, is reacted with formaldehyde in the presence of formic acid or catalytically hydrogenated in the presence of formaldehyde. The desired amides are thus obtained in good yields.

As alpha-amino-beta-hydroxy-butyric acid anilides may be mentioned, for example: alpha-amino-beta-hydroxy-butyric acid anilide, alpha-amino-beta-hydroxy-butyric acid phenetidide, alpha-amino-beta-hydroxy-butyric acid para-anisidide, alpha-amino-beta-hydroxy-butyric acid N-methyl-para-phenetidide, alpha-amino-beta-hydroxy-butyric acid N-ethyl-para-phenetidide, alpha-amino-beta-hydroxy-butyric acid meta-anisidide, alpha-amino-beta-hydroxy-butyric acid N-isopropyl-anilide, alpha-amino-beta - butyric acid N-n-butyl-para-anisidide, alpha-amino - beta - hydroxy - butyric acid N - isobutyl-anilide, alpha-amino-beta-hydroxy-butyric acid ortho-anisidide, alpha-amino-beta-hydroxy-butyric acid para-toluidide, alpha-amino-beta-hydroxy-butyric acid xylidide, alpha-amino-beta-hydroxy-butyric acid N-propyl-para-phenetidide, alpha-amino-beta-hydroxy-butyric acid-(para - carbethoxy) - anilide, alpha-amino-beta-hydroxy-butyric acid-1:2:3:4-tetrahydro-quinolide and alpha-amino - beta-hydroxy-butyric acid-1:2:3:4-tetrahydro-6-methoxy-quinolide.

These starting substances can be obtained, for instance, by treating correspondingly substituted acetoacetic acid anilides with nitrous acid and, in the nitrosation products obtained, reducing the isonitroso group and the keto group in the usual manner.

The compounds obtainable, for instance, according to the process described in U. S. appln. Ser. No. 568,197 of February 28, 1956, may be used as starting materials in the form of erythro- or threo-compounds.

Formaldehyde is advantageously used in aqueous solution. However, it is also possible to operate in the presence of inert solvents, for example benzene, toluene or xylene. Aliphatic alcohols and cyclohexane are also suited as solvents. It is also possible to use paraformaldehyde in the presence of inert solvents.

When formic acid is used it can be of advantage to effect the reaction by warming the reaction mixture to moderately elevated temperatures, advantageously to the boiling temperature of the solvent used, and by heating it then for some time on the steam bath.

The process of the present invention furnishes crystalline compounds which, according to their substituents, are more or less water-soluble. They represent valuable medicaments and exhibit a good analgesic and sedative activity accompanied by a markedly low toxicity. Owing to these properties, in conjunction with their wide therapeutic range, they are superior to the known compounds. The analgesic effect of the α-dimethylamino-β-hydroxy-butyric acid-para-phenetidide, for example, of which an aqueous solution of 1 percent strength can be prepared, corresponds to that of the known, practically water-insoluble, N-acetyl-para-phenetidine. In addition, α-dimethylamino - β - hydroxy-butyric acid-para-phenetidide possesses a sedative character and furthermore exhibits an antiphlogistic effect which corresponds to that of the known compounds mentioned above.

Of decisive importance in the use as medicament, however, is the considerably lower toxicity of α-dimethylamino-β-hydroxy-butyric acid-para-phenetidide as compared with that of the known compound mentioned above. On oral administration of α-dimethylamino-β-hydroxy-butyric acid-para-phenetidide to the mouse, the minimum lethal dose amounts to 3 grams per kilogram, whilst that of the known compound is 1.5 grams per kilogram. In the case of the rat, the minimum lethal doses amount to 9 grams per kilogram and 5 grams per kilogram respectively. In determining the chronic toxicity in cats it was found that 27 feeds, each comprising 0.25 gram of α-dimethylamino-β-hydroxy-butyric acid-para-phenetidide per kilogram, were tolerated by 3 out of 4 animals. Only one animal died after 14 feeds. On administering the same dose of the known compound almost all the animals died after 3 to 4 feeds.

Taking into consideration the superior capacity for absorption by the body of α-dimethylamino-β-hydroxy-butyric acid-para-phenetidide which results from its superior solubility, the advantages shown by the compounds of the present invention as regards toxicity become still more evident.

The following examples serve to illustrate the invention, but they are not intended to limit it thereto:

Example 1

(a) 23.8 grams of α-amino-β-hydroxy-butyric acid-para-phenetidide, 13.5 grams of formic acid and 16 grams of a formaldehyde solution of 40 percent strength are heated for one hour on the steam bath, a vigorous evolution of carbon dioxide taking place. An excess of sodium hydroxide solution is added and the solution is then extracted with ether. After the ether has been distilled off, the α-dimethylamino-β-hydroxy-butyric acid-para-phenetidide is obtained in the form of an oil which crystallises after repeated boiling with water. The melting point of the product when recrystallised from a mixture of toluene and petroleum ether amounts to 99° C.

(b) 720 grams of α-amino-β-hydroxy-butyric acid-para-phenetidide, 340 grams of formic acid of 100 percent strength, 540 cc. of an aqueous formaldehyde solution of 40 percent strength and 3 litres of water are heated for 5 hours on the steam bath, a vigorous evolution of carbon dioxide taking place. Thereupon, dilute hydrochloric acid is added to the reaction mixture until an acid reaction to Congo red paper is obtained. After filtration and clarification with animal charcoal, the filtrate is rendered just alkaline by means of a dilute sodium hydroxide solution. There are directly obtained 648 grams (80 percent of the theoretical yield) of α-dimethyl-amino-β-hydroxy-butyric acid-para-phenetidide melting at 98° C.

(c) 147 grams of α-amino-β-hydroxy-butyric acid-para-phenetidide, 68 grams of formic acid of 100 percent strength, 108 grams of an aqueous formaldehyde solution of 40 percent strength and 300 cc. of benzene are heated under reflux for about 3 hours on the steam bath. After cooling, a mixture of 50 cc. of concentrated hydrochloric acid and 400 cc. of water is added to the reaction mixture. The aqueous layer is separated from the 2-phase system and rendered alkaline with a dilute sodium hydroxide solution. α-Dimethylamino-β-hydroxy-butyric acid-para-phenetidide separates in a good yield. After recrystallisation from ethyl acetate the product melts at 98° C.

(d) The same compound can also be obtained from α-amino-β-hydroxy-butyric acid-para-phenetidide by catalytic hydrogenation in the presence of formaldehyde.

The α-amino-β-hydroxy-butyric acid-para-phenetidide used as a starting material was prepared in the following manner:

By reaction of acetic acid, acetoacetic acid-p-phenetidide and sodium nitrite to form the isonitroso compound followed by a reduction of said compound to provide a clear filtrate which is diluted with sodium acetate and phenyl-acetic acid chloride, to produce α-phenacetyl-amino-acetoacetic acid-p-phenetidide which is hydrogenated to form α-phenacetyl-amino-β-hydroxy butyric acid-p-phenetidide which is refluxed with n-propyl alcohol and hydrochloric acid to convert the same to α-amino-β-hydroxy-butyric acid-p-phenetidide.

Example 2

26.6 grams of α-amino-β-hydroxy-butyric acid-para-carbethoxy-anilide, 13.5 grams of formic acid and 16 grams of a formaldehyde solution of 40 percent strength are heated for one hour on the steam bath after cooling and addition of a sodium hydroxide solution in excess, α-dimethylamino-β-hydroxy-butyric acid-(para-carbethoxyanilide) separates in the form of an oil which is taken up in ether. The product crystallises after drying and after the solvent has been distilled off. When recrystallised from a mixture of ethyl acetate and petroleum ether, the substance melts at 85° C.

The α-amino-β-hydroxy-butyric acid-para-carbethoxy-anilide used as starting material was prepared in the following manner:

By reaction of diketene with para-amino-benzoic acid ethyl ester there was obtained aceto-acetic acid-(para-carbethoxy-anilide) which was converted through the α-isonitroso-aceto-acetic acid-(para-carbethoxy-anilide) and by hydrogenation of the isonitroso-compound into the α-amino-β-hydroxy-butyric acid-(para-carbethoxy-anilide).

Example 3

26.4 grams of α-amino-β-hydroxy-butyric acid-6-methoxy-1:2:3:4-tetrahydroquinolide are recated with 13.5 grams of formic acid and 16 grams of a formaldehyde solution of 40 percent strength as described in Example 1. There are obtained 20.5 grams of α-dimethylamino - β - hydroxy - butyric acid - (6 - methoxy-1:2:3:4-tetrahydroquinolide). After recrystallisation from a mixture of ethyl acetate and petroleum ether, the product melts at 97.5° C.

The α - amino - β - hydroxy - butyric acid-6-methoxy-1:2:3:4 - tetrahydroquinolide used as starting material was prepared in the following manner:

By reaction of 6-methoxy-1:2:3:4-tetrahydroquinoline with diketene there is obtained acetoacetic acid-1:2:3:4-tetrahydro-6-methoxy-quinolide. By nitrosation and reduction, the latter is converted into the isonitroso-compound which is then transformed by hydrogenation into α-amino-β-hydroxy-butyric acid-6-methoxy-1:2:3:4-tetrahydro-quinolide.

Example 4

To 26.5 grams of α-amino-β-hydroxy-butyric acid-(N-methyl-para-phenetidide) are added 26.5 cc. of a formaldehyde solution of 40 percent strength. The clear solution is then heated with 13 cc. of formic acid of 85 percent strength for 45 minutes on the steam bath. After cooling and addition of potassium carbonate solution in excess, α-dimethylamino-β-hydroxy-butyric acid-(N-methyl-para-phenetidide) separates in the form of an oil which is then taken up in either. After drying and evaporating the solvent, crystallisation sets in after some standing. The yield amounts to 18 grams. The melting point is 82° C.

The α-amino-β-hydroxy-butyric acid-(N-methyl-para-phenetidide) was prepared in the following way:

N-methyl-para-phenetidine is reacted with diketene to form acetoacetic acid-N-methyl-para-phenetidide. By nitrosation in the usual manner the latter is converted into the isonitroso compound of acetoacetic acid-N-methyl-para-phenetidide from which the α-amino-β-hydroxy-butyric acid-(N-methyl-para-phenetidide) is obtained by hydrogenation.

Example 5

21.5 grams of α-amino-β-hydroxy-butyric-acid-(N-n-butyl-para-anisidide) are heated for a short time, while shaking, with 21.5 cc. of a formaldehyde solution of 40 percent strength and 21.5 cc. of water. An oil is formed which solidifies after a few minutes. After addition of 11 cc. of formic acid of 85 percent strength, the product is heated for 30 minutes on the steam bath. After addition of water and filtration, the filtrate is made alkaline by means of potassium carbonate solution. The precipitated oil (crude yield 22.5 grams) solidifies instantaneously. After recrystallisation from cyclohexane, the α-dimethylamino-β-hydroxy-butyric acid-(N-n-butyl-para-anisidide) is obtained having a melting point of 101° C.

The α-amino-β-hydroxy-butyric acid-(N-n-butyl-para-anisidide) was prepared in the following way:

N-n-butyl-acetoacetic acid-para-anisidide obtained from N-n-butyl-para-anisidine and diketene yields upon nitrosation of the isonitroso-acetoacetic acid-N-n-butyl-para-anisidide. By hydrogenation the latter is converted into the α-amino-β-hydroxy-butyric acid-(N-n-butyl-anisidide).

Example 6

35 grams of α-amino-β-hydroxy-butyric acid-para-chloranilide are refluxed for one hour with 21 grams of formic acid, 35 cc. of water and 25.4 grams of an aqueous formaldehyde solution of 40 percent strength. The solution which is first turbid clears up after cooling and is then rendered alkaline by means of a dilute sodium hydroxide solution. The oil that has separated solidifies very soon and is then filtered with suction. After recrystallisation from a mixture of ethyl acetate and petroleum ether, the α-dimethylamino-β-hydroxy-butyric acid-para-chloranilide is obtained having a melting point of 90–91° C.

The starting material is prepared in the following manner:

Acetoacetic acid-para-chloranilide obtained from para-chloraniline and diketene yields upon nitrosation the α-isonitroso-acetoacetic acid-para-chloranilide melting at 177–178° C. By hydrogenation the latter is converted into the α-amino-β-hydroxy-butyric acid-para-chloranilide having a melting point of 126–127° C.

*Example 7*

109 grams of α-amino-β-hydroxy-butyric acid-3-chloro-4-methyl-anilide are heated for 4–5 hours on the steam bath with 450 cc. of water, 51.5 grams of formic acid of 100 percent strength and 82 grams of an aqueous formaldehyde solution of 40 percent strength. The reaction mixture is cooled and then mixed with 37 cc. of concentrated hydrochloric acid, whereby dissolution occurs to a large extent. After dilution with 1.5 litres of water, the solution is filtered and rendered alkaline with sodium hydroxide solution. After standing in ice, 88 grams of α-dimethylamino-β-hydroxy-butyric acid-3-chloro-4-methyl-anilide are obtained. After recrystallisation from a mixture of ethyl acetate and petroleum ether, the product melts at 101–102° C.

The starting material is prepared in a manner similar to that indicated in making the starting material of Example 6, except that acetoacetic acid-3-chloro-4-methyl-anilide is the initial reagent.

We claim:

1. α-Amino-β-hydroxy-butyric acid anilides of the general formula

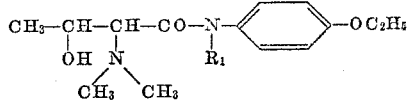

wherein $R_1$ is a member selected from the group consisting of hydrogen and methyl.

2. The compound of the formula

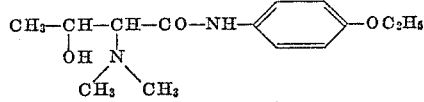

3. The compound of the formula

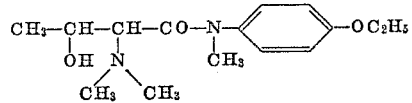

References Cited in the file of this patent

FOREIGN PATENTS 726,080    Great Britain  ---------- Mar. 16, 1955